(12) United States Patent
Ashdown

(10) Patent No.: US 8,754,960 B2
(45) Date of Patent: Jun. 17, 2014

(54) SYSTEMS AND APPARATUS FOR IMAGE-BASED LIGHTING CONTROL AND SECURITY CONTROL

(75) Inventor: Ian Edward Ashdown, West Vancouver (CA)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/318,400

(22) PCT Filed: Apr. 7, 2010

(86) PCT No.: PCT/IB2010/051503
§ 371 (c)(1),
(2), (4) Date: Nov. 1, 2011

(87) PCT Pub. No.: WO2010/125483
PCT Pub. Date: Nov. 4, 2010

(65) Prior Publication Data
US 2012/0057050 A1    Mar. 8, 2012

Related U.S. Application Data

(60) Provisional application No. 61/174,508, filed on May 1, 2009.

(51) Int. Cl.
*H04N 9/68* (2006.01)
*H04N 7/18* (2006.01)
*H04N 1/60* (2006.01)

(52) U.S. Cl.
CPC ............... *H04N 1/60* (2013.01); *H04N 1/6086* (2013.01)
USPC .......................................... 348/234; 348/143

(58) Field of Classification Search
USPC .................................. 348/143, 207.1, 207.11
See application file for complete search history.

(56) References Cited

U.S. PATENT DOCUMENTS

| | | | |
|---|---|---|---|
| 6,285,804 B1* | 9/2001 | Crinon et al. ................. | 382/299 |
| 6,340,864 B1 | 1/2002 | Wacyk | |
| 6,727,938 B1* | 4/2004 | Randall ....................... | 348/143 |
| 2005/0264658 A1* | 12/2005 | Ray et al. ..................... | 348/239 |
| 2006/0000982 A1* | 1/2006 | Keller et al. ............. | 250/390.08 |
| 2006/0071153 A1 | 4/2006 | Huber et al. | |
| 2006/0209176 A1* | 9/2006 | Nakamura et al. ......... | 348/14.01 |
| 2006/0244836 A1* | 11/2006 | Batur ......................... | 348/208.1 |
| 2007/0159476 A1* | 7/2007 | Grasnick ..................... | 345/419 |
| 2008/0054161 A1 | 3/2008 | Schofield et al. | |
| 2008/0180553 A1 | 7/2008 | Hassan-Shafique et al. | |
| 2010/0245610 A1* | 9/2010 | Ahn et al. ................... | 348/222.1 |

FOREIGN PATENT DOCUMENTS

| | | | |
|---|---|---|---|
| JP | 07-271426 | * | 10/1995 |
| JP | 07271426 A | | 10/1995 |
| JP | 2008312026 A | | 12/2008 |
| WO | 03102889 A1 | | 12/2003 |
| WO | 2008012715 A2 | | 1/2008 |
| WO | 2009136309 A2 | | 11/2009 |

* cited by examiner

*Primary Examiner* — Roberto Velez
*Assistant Examiner* — Stephen Coleman
(74) *Attorney, Agent, or Firm* — Yuliya Mathis

(57) ABSTRACT

Lighting control systems are disclosed that enable a combination of functions comprising natural illumination based lighting control, occupancy-based lighting control, and security control. One or more processors are used in conjunction with one or more cameras and a plurality of luminaires, to perform a combination of functions comprising natural illumination based lighting control, occupancy-based lighting control, and security control.

10 Claims, 6 Drawing Sheets

SYSTEMS AND APPARATUS FOR IMAGE-BASED LIGHTING CONTROL AND SECURITY CONTROL

TECHNICAL FIELD

The present invention is directed generally at systems and apparatus for image-based lighting control. More particularly, the present invention is directed at one or more cameras for capturing images, used in conjunction with one or more processors and a plurality of luminaires, to perform natural-illumination-based lighting control, occupancy-based lighting control, and security control.

BACKGROUND

Digital lighting technologies, i.e. illumination based on semiconductor light sources, such as light-emitting diodes (LEDs), today offer a viable alternative to traditional fluorescent, HID, and incandescent lamps. Recent advances in LED technology coupled with its many functional advantages such as high energy conversion and optical efficiency, durability, and lower operating costs, has led to the development of efficient, robust, and precisely controllable full-spectrum lighting sources.

Consequently, existing systems for natural illumination based lighting control, occupancy-based lighting control, and security control are able to utilize digital lighting technologies to more precisely monitor and control architectural spaces such as offices and meeting rooms. Existing natural illumination based lighting control systems may, for example, employ individually controllable luminaires with dimming or bi-level switching ballasts as well as one or more natural illumination photosensors to measure the average workplane illumination within a naturally illuminated space. In such systems, one or more controllers, in order to respond to daylight egress and maintain a minimum workplane illumination, may monitor the output of one or more photosensors and control illumination provided by the luminaires.

Also, conventional occupancy-based lighting control systems may utilize advances made in digital lighting technologies by employing individually controllable luminaires with dimming or switched ballasts in conjunction with one or more occupancy sensors that utilize ultrasonic transducers or pyroelectric sensors to determine whether an illuminated architectural space, such as an office, is occupied. In such systems, one or more occupancy controllers may monitor the output of the occupancy sensors and dim one or more of the luminaires when the sensors indicate that the space is unoccupied. Similarly, existing security control systems may comprise one or more digital video cameras as well as controllers, to record and monitor the output of the cameras. Existing security control systems may therefore detect and alert security personnel to potential security breaches.

Along with advances made in the field of digital lighting technologies, significant advances have been made in the field of imaging technologies, particularly image sensor technologies. As a result, image sensors are easily integrated into devices such as digital cameras, they are sophisticated enough to capture very high resolution images, and are able to demonstrate light sensitivities comparable to that of the human eye. Moreover, advances in the realms of computer networks and microprocessors have made distributed processing a reality. Networked systems that continually produce content rich data such as high-resolution images, may, as a result, gain easy access to the computing or processing capacity necessary to efficiently process large quantities of content rich data.

Despite advances made in the realms of digital lighting technologies, image sensing technologies and distributed processing, existing security control systems as well as natural-illumination-based and occupancy-based lighting control systems have failed to leverage the combined benefits provided by these advances. The failure to leverage these benefits has consequently resulted in significant disadvantages for the users of such systems. For example, while such existing systems may be able to more precisely control architectural spaces because they are able to leverage the benefits of digital lighting technologies, because such systems do not additionally leverage the benefits provided by advances made in the realm of image sensing technologies, they are unable to provide the combined functions of natural illumination based lighting control, occupancy-based lighting control, and security control. Users wishing to acquire a combination of such functionalities are therefore forced to invest in separate systems, which results in increased installation and maintenance costs.

Further, because existing natural illumination based lighting control systems, occupancy-based lighting control systems and security control systems do not leverage advances made in image sensing and distributed processing technologies, such systems are not amenable to being programmatically adjusted in response to changing environmental conditions, such as changes in the arrangement of furniture within architectural spaces. For example, existing natural illumination based lighting control systems typically comprise a silicon photodiode and an associated amplifier mounted in a housing with a focusing optic and an opaque shield, resulting in a fixed field of view that can only be modified by physically tilting or rotating the housing.

Moreover, because existing systems for security control as well as systems for natural illumination based and occupancy-based lighting control do not leverage the computing power of networked processors, they are limited in their abilities to provide the essentially constant data gathering and processing required in order to closely and efficiently monitoring heavily utilized architectural spaces.

As a result, there exists a significant need in the art to simultaneously leverage advances made in the realms of digital lighting technologies, image-based sensing technologies and networked or distributed processing technologies in order to provide users with cost effective systems that provide the combined benefits of lighting control based on changes in natural illumination and occupancy, as well as security control. Such systems could utilize digital lighting technologies to individually control luminaires in response to changes in natural illumination or occupancy. Such systems could additionally utilize image-based sensors, such as the sensors used by digital cameras, to rapidly generate image data capable of providing information relating to natural illumination, occupancy, as well as security. Finally, such systems could also utilize multiple networked processors to efficiently process the generated image data in order that heavily used and therefore constantly changing spaces may be closely monitored and controlled.

SUMMARY

Applicant has recognized that there is a real need in the art to combine advances made in the realms of controllable solid-state lighting with advances made in the realms of image sensor technologies and networked or distributed processing and that known solutions for natural illumination-based-lighting control, occupancy-based lighting control, and/or security control pose significant disadvantages. First, users of the current technological solutions must install and maintain more than one system to receive security control as well as natural illumination based and occupancy-based lighting control functionalities. This results in unnecessary additional costs. Second, since current lighting control systems do not leverage the benefits of networked or distributed processing, they often lack the capacity to process the large amounts of data associated with heavily utilized and therefore constantly changing environments. Third, because such systems often utilize component technologies that cannot be programmatically controlled, physical manipulation is often required in order to adapt such systems to substantial environmental changes that affect their performance, such as a rearrangement of furniture.

Applicant has further recognized that combining advances made in the fields of controllable solid-state lighting, image-based sensing, and distributed processing, has the potential to overcome the drawbacks present in existing systems for security control, natural illumination based lighting control and occupancy-based lighting control. Consequently, various embodiments and implementations of the present invention are directed at lighting control systems and apparatus capable of (1) utilizing digital lighting technologies to individually control luminaires in response to changes in natural illumination or occupancy, (2) utilizing image sensors to rapidly generate image data capable of providing information relating to natural illumination, occupancy, and/or security, and/or (3) utilizing multiple networked processors to efficiently process such generated data in order that heavily used and therefore constantly changing spaces may be closely monitored and controlled.

Many embodiments of the present invention involve the use of cameras and one or more processors for detecting and reacting to (1) the amount of natural light illuminating an architectural space, (2) the number, identity or location of occupants within such a space, and (3) potential breaches in security within such a space. For example, in many embodiments, one or more cameras in an architectural space such as an office or a living room captures images of the space and transmits signals indicative of the captured images. A processor, in signal communication with the one or more cameras, receives the signals indicative of the captured images, and processes the images. The processor may utilize multiple other processors to efficiently process the images. The images may be processed to detect changes in natural light or occupancy. The processor may then control one or more luminaires in response to the detected changes in natural illumination or occupancy. The images may also be processed to detect security breaches. Upon detecting one or more security breaches, the processor may control one or more of the luminaires in order to, for example, alert security personnel of the detected security breaches and/or disadvantage the perpetrator(s) of the security breaches.

Generally, a lighting control system according to various embodiments of the invention includes a camera, a processor, and a plurality of individually controllable luminaires. The camera captures at least one image and transmits an image signal that includes information describing the at least one image. The processor receives the image signal, extracts the information describing the at least one image from the image signal, and processes the at least one image to determine an indicator of natural illumination. Additionally or alternatively, the processor may determine an indicator of occupancy. Also additionally or alternatively, the processor may determine an indicator of security. The processor also generates a control signal for the plurality of individually controllable luminaires based on the indicator(s) of natural illumination, occupancy, and/or security.

Many embodiments of the invention employ multiple cameras and/or multiple processors. A processor according to other embodiments of the invention may process the at least one image to determine at least two of the following: an indicator of natural illumination, an indicator of occupancy, and an indicator of security. A processor processing at least one image to determine an indicator of security may examine the at least one image to identify a security breach. The processor may also generate a control signal for the plurality of individually controllable luminaires based on one or more of: an indicator of natural illumination, an indicator of occupancy, and an indicator of security.

According to some aspects of the invention, processing the at least one image to determine an indicator of natural illumination involves measuring an average workplane illuminance associated with a space. According to some other aspects of the invention, the processor processes the at least one image to effect an adjustable field of view associated with the camera. The adjustable field of view associated with the camera may be effected by the processor electronically masking the at least one image. The processor may process the at least one image to effect an adjustable per-pixel sensitivity associated with the camera. The adjustable per-pixel sensitivity associated with the camera may be effected by the processor multiplying the at least one image with a gray-scale mask image on a per-pixel basis. The processor may also process the at least one image in order to effect an increase in dynamic range associated with the camera. The increase in dynamic range associated with the camera may be effected by the processor subjecting the at least one image to a logarithmic transfer function before the at least one image is digitized. The increase in dynamic range may also be effected by the camera capturing a temporal sequence of images and the processor combining the captured images on a per-pixel basis.

According to some aspects of the invention, a camera associated with the invention may have a combination of: a first color channel, a second color channel and a third color channel. The camera may generate a first set of images associated with the first color channel, a second set of images associated with the second color channel, and a third set of images associated with the third color channel. One or more processors associated with the invention may process the images generated by the camera by comparing two or more of the following: the first set of images, the second set of images, and the third set of images.

For example, in some embodiments of the invention, the camera includes a red color channel, a green color channel, and a blue color channel. The processor in such an embodiment may process the at least one image to effect a spectral responsivity distribution associated with the camera that approximates the spectral responsivity associated with the human eye. The processor may effect such a spectral responsivity associated with the camera by: using the at least one image to calculate an estimate of a spectral power distribution of natural and synthetic illumination associated with a space depicted in the at least one image, calculating a workplane illuminance associated with the space, and calculating a multiplier for the workplane illuminance based on the spectral power distribution of the natural and synthetic illumination associated with the space.

Some aspects of the invention employ multiple cameras in signal communication with one or more processors. Such aspects may include, for example, a first camera with a first field of view, and a second camera with a second field of view. The first field of view and the second field of view may additionally overlap. Moreover, the first camera may capture a first image and the second camera may capture a second image. One or more processors, according to some aspects of the invention may determine an indicator of occupancy by, for example, examining both the first image and the second image to identify one or more indicators of occupancy.

According to many aspects of the invention, the at least one image includes a background image and a foreground image, where the images are temporally separated. The processor processes the at least one image by employing techniques comprising one or more of the following steps: subtracting the background image from the foreground image on a per-pixel basis to yield a subtracted image; subjecting the subtracted image to an image segmentation algorithm; generating a set of binary images from the subtracted image, the set of binary images comprising a combination of: a red binary image, a green binary image, and a blue binary image; and applying a mipmap operator to the set of binary images to yield a set of image hierarchies comprising a combination of: a red image hierarchy, a green image hierarchy, and blue image hierarchy.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same or similar parts throughout the different views. Also, the drawings are not necessarily to scale, emphasis instead generally being placed upon illustrating the principles of the invention.

DETAILED DESCRIPTION

Reference is now made in detail to illustrative embodiments of the invention, examples of which are shown in the accompanying drawings.

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

Figure 1:
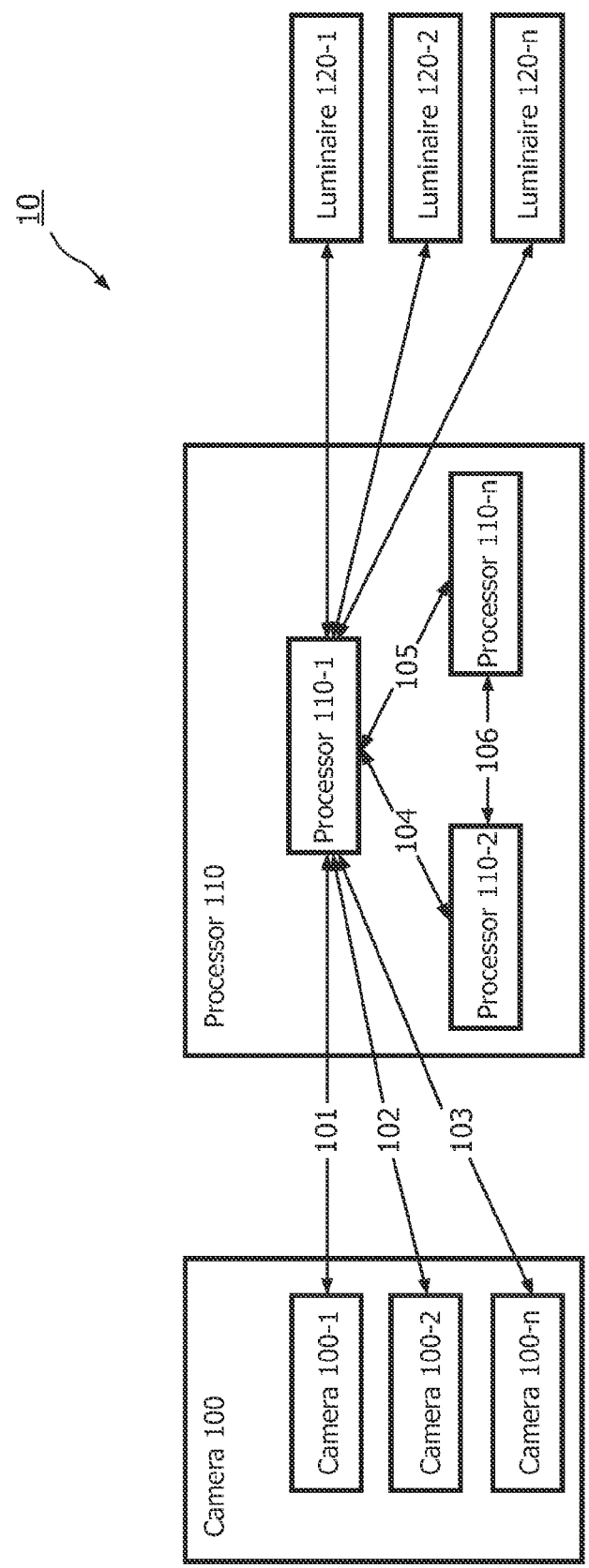
FIG. 1 illustrates a lighting control system, according to some embodiments of the invention, for performing a combination of functions comprising natural illumination based lighting control, occupancy-based lighting control, and security control.

FIG. 1 illustrates a lighting control system 10 according to many embodiments of the invention. System 10 includes a processor 110, a camera 100, and luminaires 120-1, 120-2, and 120-$n$. In embodiments of the invention, system 10 may include additional processors, for example, processors 110-1, 110-2, and 110-$n$. System 10 may also include additional cameras such as cameras 100-1, 100-2 and 100-$n$. Camera 100-1 captures at least one first image and transmits, via link 101, a first image signal including information describing the at least one first image. Camera 100-2 may capture at least one second image and camera 100-$n$ may capture at least one third image. Camera 100-2 may transmit, via link 102 a second image signal including information describing the at least one second image. Likewise, camera 100-$n$ may transmit, via link 103, a third image signal including information describing the at least one third image.

The term "link" as used herein refers to any connection that enables the communication of information between at least two devices. For example, a link includes a wired communications connection, a wireless communications connection, a radio frequency communications connection, and an optical communications connection.

The term "camera" as used herein refers to any device that transforms an optical image into an electric signal. Embodiments of a camera include, but are not limited to, conventional charge-coupled devices, complementary metal-oxide-semiconductor active-pixel sensors, and digital cameras.

The term "processor" as used herein refers to any circuitry that processes arithmetic and logic instructions, such as a central processing unit of a computer capable of manipulating information. Embodiments of processor 110-1, processor 110-2, and processor 110-$n$ include, but are not limited to, conventional microprocessors, application specific integrated circuits (ASICs), and field-programmable gate arrays (FPGAs).

In many embodiments of lighting control system 10, such those illustrated in FIG. 1, processor 110-1, in signal communication with camera 100-1, camera 100-2 and camera 100-$n$ receives, via link 101, the first image signal. Processor 110-1 also receives, the second image signal, via link 102, and the third image signal, via link 103. Processor 110-1 may extract the information describing the at least one first image from the first image signal. Processor 110-1 may also extract the information describing the at least one second image from the second image signal, and extract the information describing the at least one third image from the third image signal. Processor 110-1 may process one or more of: the at least one first image, the at least one second image, and the at least one third image, to determine one or more of: an indicator of natural illumination, an indicator of occupancy, and an indicator of security.

In many implementations of system 10, processor 110-1 is communicatively coupled to processor 110-2 via link 104, and communicatively coupled to processor 110-*n* via link 105. Processors 110-2 and 110-*n* may additionally be communicatively coupled to each other via link 106. Processor 110-1 may process the at least one first image, the at least one second image, and the at least one third image by utilizing processor 110-2 and processor 110-*n*. Additionally, processor 110 may generate a first control signal for luminaire 120-1, a second control signal for luminaire 120-2, and a third control signal for luminaire 120-*n*, where the control signals generated are based on one or more of: an indicator of natural illumination, an indicator of occupancy, and an indicator of security.

The phrase "indicator of natural illumination" as used herein refers to any indication of a change in the amount of natural light illuminating a space. The phrase "indicator of natural illumination" includes, but is not limited to, an indication of an increase or a decrease in the amount of sunlight illuminating a space such as an office, and an indication of an increase or a decrease in the amount of moonlight illuminating any space.

The phrase "indicator of occupancy" as used herein refers to any indication of a change in the occupancy of a space. The phrase "indicator of occupancy" includes, but is not limited to, any indication of one or more persons entering or leaving a space, and any indication of one or more persons changing positions within a space.

The phrase "indicator of security" as used herein refers to any indication of a security breach. The phrase "indicator of security" includes, but is not limited to, any indication of an intruder or otherwise unidentified individual within a space, any indication of objects displaced within a space, and any indication of suspicious activity within a space.

The term "luminaire" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

The term "light source" should be understood to refer to any one or more of a variety of radiation sources, including, but not limited to, LED-based sources, incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

A given luminaire may be configured to generate electromagnetic radiation within the visible spectrum, outside the visible spectrum, or a combination of both. Hence, the terms "light" and "radiation" are used interchangeably herein. Additionally, a luminaire may include as an integral component one or more filters (e.g., color filters), lenses, or other optical components. Also, it should be understood that luminaires may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more luminaires. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources). The term "spectral power distribution" is understood to refer to the power per unit area per unit wavelength of an illumination, or the per-wavelength contribution to any radiometric quantity (e.g. radiant energy, radiant flux, radiant intensity, radiance, irradiance, radiant exitance, or radiosity).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the term "different colors" implicitly refers to multiple spectra having different wavelength components and/or bandwidths. It also should be appreciated that the term "color" may be used in connection with both white and non-white light.

According to some implementations of system 10, processor 110-1 may additionally process the at least one first image to effect an adjustable field of view associated with camera 100-1. Processing the at least one first image to effect an adjustable field of view may comprise electronically masking the at least one first image. The phrase "electronically masking" as used herein includes, but is not limited to, the process of using a pattern of bits, bytes, or characters to affect the elimination of bits, bytes, or characters in another pattern. According to some other embodiments of system 10, processor 110-1 may additionally process the at least one first image to effect an adjustable per-pixel sensitivity associated with camera 100-1. Processing the at least one first image to effect an adjustable per-pixel sensitivity may comprise multiplying the at least one first image with a gray-scale mask image on a per-pixel basis.

According to other implementations of system 10, processor 110-1 may additionally process the at least one first image to effect an increase in a dynamic range associated with camera 100-1. Processing the at least one first image to effect an increase in dynamic range may comprise subjecting the at least one image to a logarithmic transfer function before digitizing the at least one image. The "dynamic range" associated with a camera, as used herein, includes, but is not limited to, a ratio between the maximum and minimum light intensities measurable by the camera.

According to many implementations of system 10, the at least one first image may comprise a first image and a second image, where the first image is captured by camera 100-1 before camera 100-1 captures the second image. One or more of processors 110-1, 110-2, and 110-$n$ may process the first image and the second image to determine one or more of: an indicator of natural illumination, an indicator of occupancy, and an indicator of security. This processing may comprise combining the first image with the second image on a per-pixel basis, which may yield an increase in the dynamic range associated with camera 100-1.

In various implementations of system 10, processor 110-1 processes the at least one first image, the at least one second image, and the at least one third image by utilizing processor 110-2 and processor 110-$n$. Processor 110-1 may utilize processors 110-2 and 110-$n$ for image processing by transmitting the at least one second image, via link 104, and by transmitting the at least one third image, via link 105. Processor 110-2 may receive the at least one second image, and process the at least one second image to determine one or more of: an indicator of natural illumination, an indicator of occupancy, and an indicator of security. Likewise, processor 110-$n$ may receive the at least one third image, and process the at least one third image to determine one or more of: an indicator of natural illumination, an indicator of occupancy, and an indicator of security. In many embodiments, processor 110-2 may process the at least one second image while processor 110-$n$ processes the at least one third image and processor 110-1 processes the at least one first image, thereby increasing processing efficiency.

In many implementations of system 10, luminaires 120-1, 120-2 and 120-$n$ include a plurality of arrangements of one or more lighting units. The plurality of arrangements of the one or more lighting units may additionally comprise one or more LED-based light sources. According to other embodiments of system 10, luminaires 120-1, 120-2 and 120-$n$ may each comprise at least one solid-state lighting luminaire. The at least one solid-state lighting luminaire may further comprise at least one light-emitting diode (LED), and the at least one light-emitting diode may be optically modulated for enabling optical communications. The term "optical communication" as used herein refers to any form of telecommunications using light as the communication or transmission medium, including free-space optical communication.

In various implementations of system 10, cameras 100-1, 100-2, and 100-$n$ are located with the housings of luminaires such as luminaire 120-1, 120-2 or 120-$n$. In other embodiments, cameras are located at sites remote from the luminaires, and communicate with the luminaires using, for example, infrared transceiver technology and wireless transceiver technology.

According to some implementations of system 10, processor 110-1 processes the at least one first image by providing the at least one image as input to a neural network. The neural network may include one or more tasks executed by one or more of processors 110-1, 110-2 and 110-$n$. For example, processors 110-2 and 110-$n$ may execute one or more tasks that are part of a larger neural network application that has been trained by example to determine one or more of: indicators of natural illumination, indicators of occupancy, and indicators of security. The neural network utilized by processors 110-1, 110-2, and 110-$n$ may be additionally trained to respond to such indicators either by itself generating control signals for luminaires 120-1, 120-2 and 120-$n$ or by providing processors 110-1, 110-2 and 110-$n$ information relating to the generation of such control signals.

Figure 2:
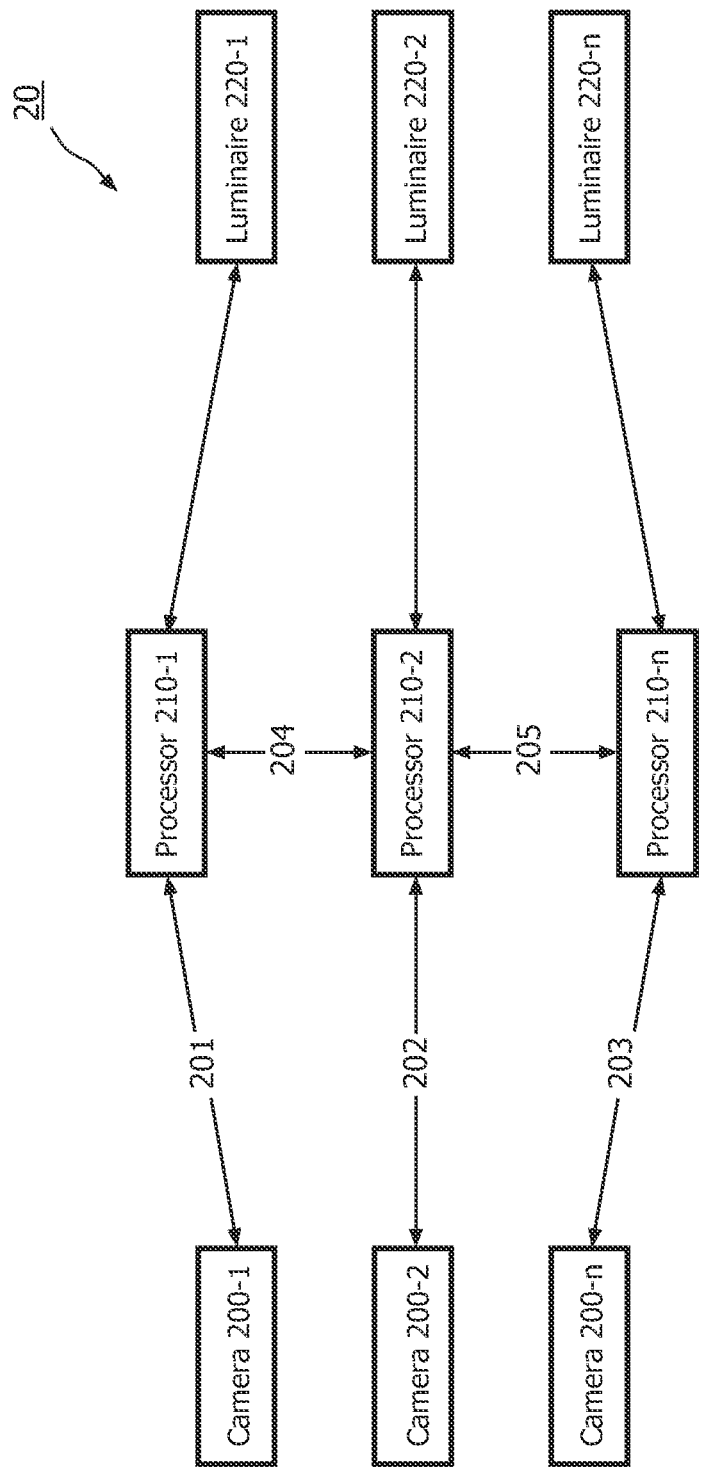
FIG. 2 illustrates a lighting control system, according to some other embodiments of the invention, for performing a combination of functions comprising natural illumination based lighting control, occupancy-based lighting control, and security control.

FIG. 2 illustrates an alternative arrangement of elements in a lighting control system 20 according to many embodiments of the invention. System 20 includes processors 210-1, 210-2, and 210-n; cameras 200-1, 200-2, and 200-n; and luminaires 220-1, 220-2, and 220-n. Processors 210-1, 210-2, and 210-n may be any type of processor described with respect to FIG. 1. Likewise, cameras 200-1, 200-2, and 200-n may be any type of camera described with respect of FIG. 1, and luminaires 220-1, 220-2, and 220-n may be any type of luminaire described with respect to FIG. 1. Camera 200-1 captures at least one first image, and transmits, via link 201, a first image signal including information describing the at least one first image. Camera 200-2 captures at least one second image, and transmits, via link 202, a second image signal including information describing the at least one second image. Likewise, camera 200-n captures at least a third image, and transmits, via link 203, a third image signal including information describing the at least one third image. Processor 210-1, in signal communication with at least camera 200-1, receives the first image signal, via link 201. Processor 210-2, in signal communication with at least camera 200-2, receives the second image signal, via link 202. Likewise, processor 210-n, in signal communication with at least camera 200-n, receives the third image signal, via link 203.

According to many implementations of lighting control system 20, illustrated in FIG. 2, processor 210-1 extracts the information describing the at least one first image from the first image signal. Likewise, processor 210-2 may extract the information describing the at least one second image from the second image signal, and processor 210-n may extract the information describing the at least one third image from the third image signal. Processor 210-1 may then process the at least one first image to determine one or more of: an indicator of natural illumination, an indicator of occupancy, and an indicator of security. Processor 210-2 may process the at least one second image to determine one or more of: an indicator of natural illumination, an indicator of occupancy, and an indicator of security. Likewise, processor 210-n may process the at least one third image to determine one or more of: an indicator of natural illumination, an indicator of occupancy, and an indicator of security. In many embodiments of lighting control system 20, processors 210-1, 210-2, and 210-n are communicatively coupled via links 204 and 205. One or more of processors 210-1, 210-2 and 210-n may participate together in processing one or more of the at least one first image, the at least one second image, and the at least one third image to determine one or more of: an indicator of natural illumination, an indicator of occupancy, and an indicator of security.

According to some implementations of system 20, camera 200-1 includes a red color channel, a green color channel, and a blue color channel. Processor 210-1 may additionally process the at least one image to effect a spectral responsivity distribution associated with camera 200-1 that approximates the spectral responsivity associated with the human eye. Processor 210-1 may effect such a spectral responsivity by processing the at least one first image, where the processing comprises: calculating an estimate of a spectral power distribution of natural and synthetic illumination associated with a space depicted in or otherwise related to the at least one first image, calculating a workplane illuminance associated with the space, and calculating a multiplier for the workplane illuminance based on the estimated spectral power distribution of the natural and synthetic illumination associated with the space. The term "workplace illuminance" as used herein refers, but is not limited to, the amount of light illuminating a work surface.

According to various implementations of system 20, camera 200-1 has an associated first field of view, and camera 200-2 has an associated second field of view, where the first field of view overlaps with the second field of view. Processor 210-1 may process the at least one first image and processor 210-2 may process the at least one second image to determine one or more of: an indicator of occupancy, an indicator of natural illumination, an indicator of security. Embodiments of system 20 that involve a plurality of processors processing a plurality of images captured by cameras with overlapping fields of views are likely to lead to more reliable determinations of indicators of occupancy, natural illumination and security because the overlapping fields of views better enables such embodiments to detect and ignore irrelevant information that may be generated as a result of image processing. For example, when determining an indicator of natural illumination, objects within a camera's field of view may lead to an erroneous determination of a change in natural illumination. However, the use of a second camera with an overlapping field of view could aid in avoiding such an erroneous determination.

According to various embodiments of the invention, camera 200-1 combines a first color channel, a second color channel and a third color channel. The at least one first image may be a combination of: a first set of images associated with the first color channel, a second set of images associated with the second color channel, and a third set of images associated with the third color channel. One or more of processors 210-1, 210-2, and 210-n may process the at least one first image. The processing of the at least one first image may entail comparing two or more of the following: the first set of images, the second set of images, and the third set of images. By comparing images from different color channels, various embodiments of system 20 are likely to more accurately determine indicators of occupancy, particularly under circumstances that involve objects moving against backgrounds that are similarly colored as compared to the moving objects.

The at least one first image may comprise a higher resolution image and a lower resolution image. The higher resolution image and the lower resolution image may additionally be related. For example, the lower resolution image may have been generated using the higher resolution image. Processor 210-1 may process the at least one first image by examining the lower resolution image for preliminary data. The preliminary data, may include, but is not limited to, data evidencing object displacement. If an examination of the lower resolution image reveals the existance of the preliminary data, processor 210-1 may further examine the higher resolution image for further evidence of such preliminary data, or other evidence related or unrelated to the preliminary data.

Figure 3:
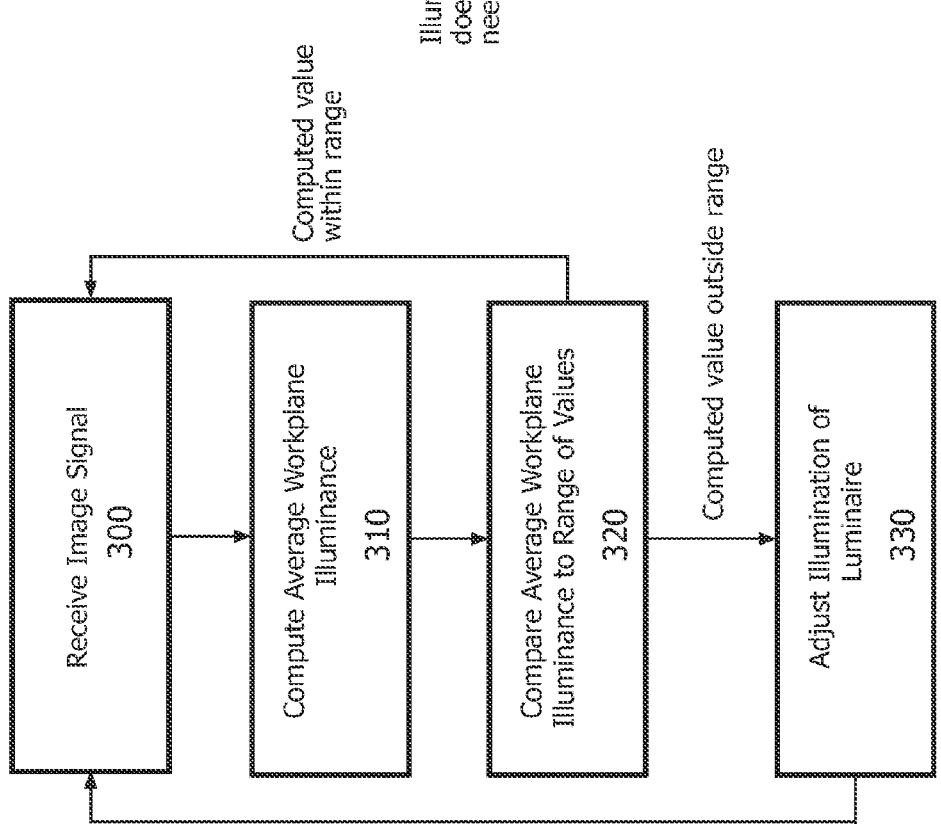
FIG. 3 illustrates a method, according to some embodiments of the invention, for performing natural illumination based lighting control implemented by one or more processors.

FIG. 3 illustrates steps that may be executed by at least one processor according to embodiments of the invention. The at least one processor may be included in a lighting control system, such as system 10 or system 20. In step 300, the at least one processor receives one or more image signals, and extracts information describing at least one image from the one or more image signals. The processor(s) determines an indicator of natural illumination associated with a space depicted in or otherwise related to the at least one image. The determination of the indicator of natural illumination is based at least in part on the extracted information. In step 310, the processor computes an average workplane illuminance associated with the space to determine an indication of natural illumination associated with the space. In step 320, the processor compares the average workplane illuminance associated with the space to a particular range of values. If the computed average workplane illuminance associated with the space is within the particular range of values, the one or more processors may request one or more additional image signals for processing. Alternatively, the processor may simply wait to receive the next image signal. Still alternatively, the processor may periodically request an image signal. If, on the other hand, the computed average workplane illuminance associated with the space is outside the particular range of values, the one or more processors generates a control signal to adjust the illumination of at least one of a plurality of individually controllable luminaires (step 330).

Figure 4:
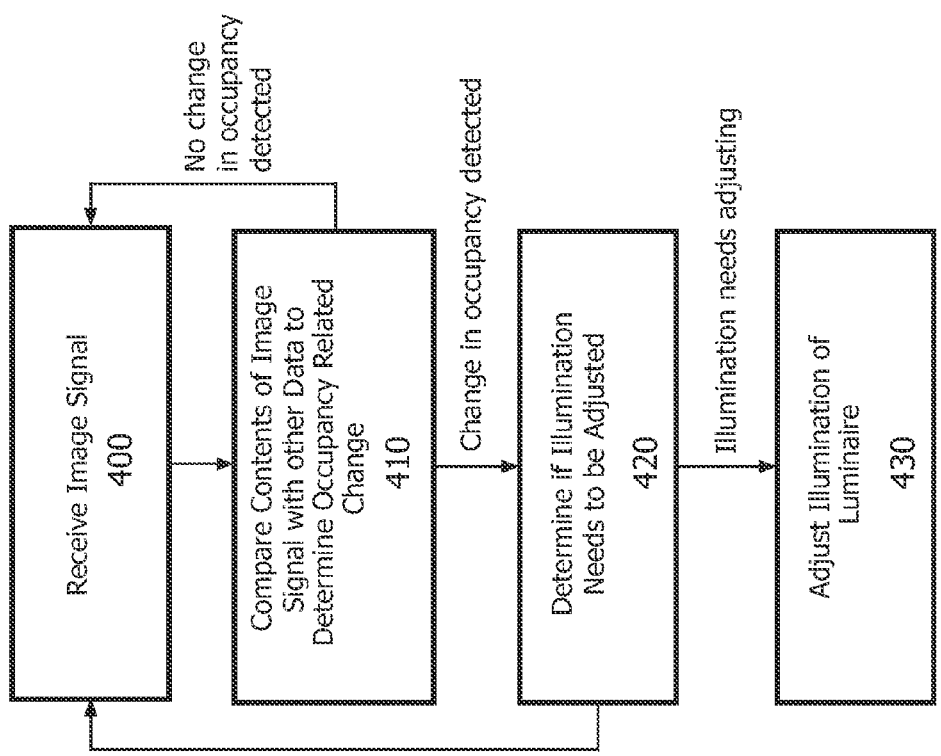
FIG. 4 illustrates another method, according to some embodiments of the invention, for performing occupancy based lighting control, implemented by one or more processors.

FIG. 4 illustrates steps that may be executed by at least one processor according to embodiments of the invention. The at least one processor may be included in a lighting control system, such as system 10 or system 20. In step 400, the at least one processor receives one or more image signals. In step 410, the at least one processor extracts information describing at least one image from the one or more image signals, and compares the at least one image with other available information, such as one or more other images, to determine an indicator of occupancy associated with a space. For example, comparing the at least one image with a previously captured image of the same space may reveal a change in occupancy. If no occupancy-related change is found, the at least one processor may request one or more additional image signals for processing. Alternatively, the processor may simply wait to receive the next image signal. Still alternatively, the processor may periodically request an image signal. If, on the other hand, any evidence of occupancy-related change is found, the at least one processor may determine, in step 420, if illumination associated with the space needs to be adjusted. If no adjustment in illumination is necessary despite evidence of occupancy-related change being present, the at least one processor may request and process one or more additional image signals. If, on the other hand, the at least one processor determines that illumination associated with the architectural space needs to be adjusted, the at least one processor generates a control signal to adjust the illumination of at least one of a plurality of individually controllable luminaires (step 430).

Figure 5:
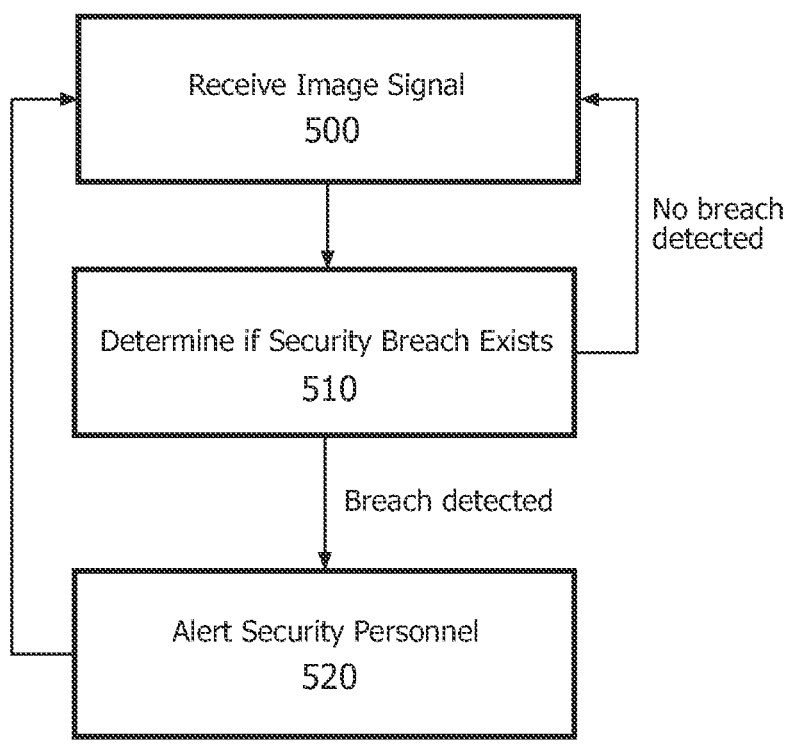
FIG. 5 illustrates a method, according to some other embodiments of the invention, for performing security control, implemented by one or more processors.

FIG. 5 illustrates steps that may be executed by at least one processor in accordance with the invention. The at least one processor may be included in a lighting control system, such as system 10 or system 20. As illustrated in step 500 of FIG. 5, the at least one processor receives one or more image signals. In step 510, the at least one processor extracts information describing at least one image from the one or more image signals to determine if a security breach exists. If a security breach is determined to exist, then the at least one processor proceeds to step 520 and alerts security personnel of the security breach. For example, the at least one processor may generate a control signal to adjust the illumination of at least one luminaire in order to visually alert security personnel of the security breach. If no security breach is determined to exist, the at least one processor returns to step 500 to receive one or more image signals.

Figure 6:
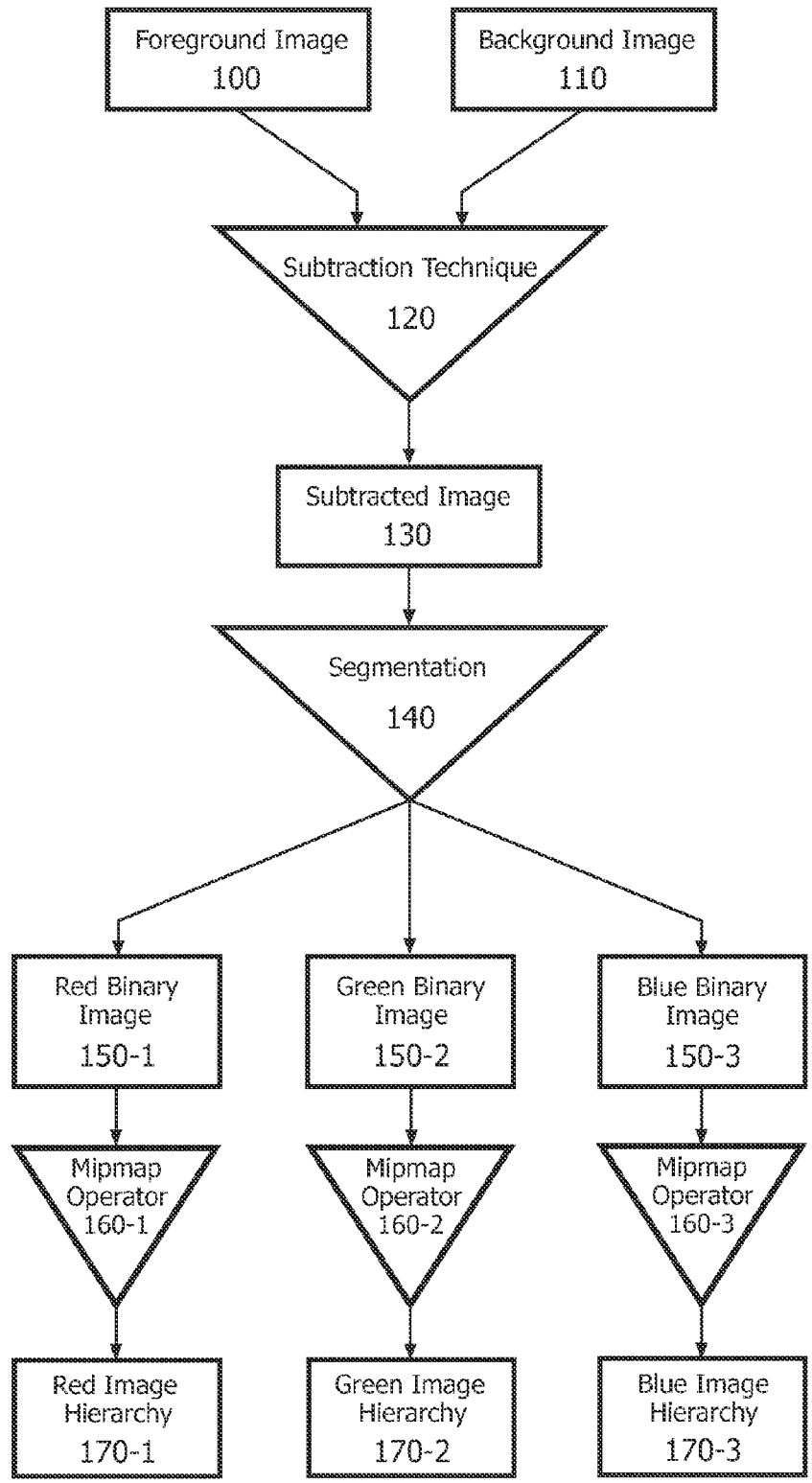
FIG. 6 illustrates a method, according to some embodiments of the invention, for performing one or more of: natural illumination based lighting control, occupancy based lighting control, and security control.

FIG. 6 conceptually illustrates image segmentation that may be performed by at least one processor in accordance with various embodiments of the invention, to determine indicators of natural illumination, occupancy, and/or security. As illustrated in FIG. 6, the at least one processor receives a first image signal, the first image signal comprising information describing at least one background image 110. The at least one background image 110 may be an image of a space, for example, space S1, captured at some point in time, for example at time T1. The at least one processor also receives a second image signal, the second image signal comprising information describing at least one foreground image 100, where the at least one foreground image 100 is, for example, an image of space S1 captured at a point in time T2, where T2 is different from T1. As illustrated in FIG. 6, the at least one processor subtracts the at least one foreground image 100 from the at least one background image 110 using a subtraction technique 120 to yield a subtracted image 130. Subtraction technique 120 may subtract the at least one foreground image 100 from the at least one background image 110 on a per-pixel basis. The at least one processor thereafter subjects the subtracted image 130 to an image segmentation technique 140. The image segmentation technique may be utilized to reduce background noise. Subjecting the subtracted image 130 to the image segmentation technique 140 yields, as shown in FIG. 6, a plurality of binary images comprising: a red binary image 150-1, a green binary image 150-2, and a blue binary image 150-3. In addition to the red, green, and blue binary images depicted in FIG. 6, binary images of other colors may also be generated. The processor thereafter subjects each of the binary images to a mipmap operator to yield a plurality of image hierarchies. For example, as shown in FIG. 6, the red binary image 150-1 is subjected to mipmap operator 160-1 to yield a red image hierarchy 170-1. Similarly, the green binary image 150-2 is subjected to mipmap operator 160-2 to yield a green image hierarchy 170-2. Likewise, the blue binary image 150-3 is subjected to mipmap operator 160-3 to yield a blue image hierarchy 170-3.

Applicant hereby incorporates by reference image segmentation techniques described in Otsu N., "A Threshold Selection Method from Gray-Level Histograms," IEEE Transactions on Systems, Man, and Cybernetics SMC-9(1): 62:66). As used herein, the term "mipmap" refers to, but is not limited to, a technique commonly used in computer graphics to increase rendering speed and reduce artifacts associated with aliasing. The term "binary image" as used herein generally refers to any digital image where each pixel may have one of two possible values.

Figure 7:
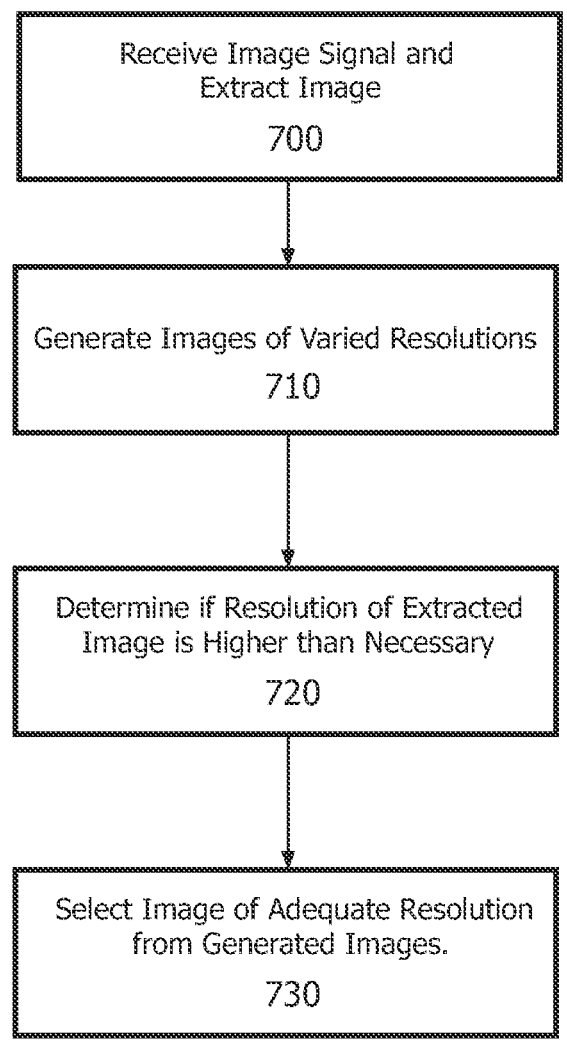
FIG. 7 illustrates a method for efficient image processing, according to some embodiments of the invention, and implemented by one or more processors.

FIG. 7 illustrates steps that may be executed by at least one processor in accordance with the invention. The at least one processor may be included in a lighting control system such as system 10 or 20. In step 700, the at least one processor receives an image signal including information describing at least one image, and extracts the information describing the at least one image. In step 710, the at least one processor generates, using at the least one image, a plurality of images of a plurality of resolutions. In step 720, the at least one processor determines if the resolution of the at least one image is higher than is necessary in order for the at least one processor to determine one or more of: an indicator of natural illumination, an indicator of occupancy, and an indicator of security. For example, the at least one processor may execute task A, a task that takes as input the at least one image, in order to determine an indicator of natural illumination. Under such circumstances, the at least one processor, in step 720, may determine if task A requires as input, images that are higher in resolution than the resolution of the at least one image. If step 720 results in a determination that the resolution of the at least one image is higher than is necessary, then the at least one processor proceeds to step 730 and selects for processing one or more images from the plurality of generated images such that the selected one or more images are lower in resolution that the extracted at least one image.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Any reference numerals or other characters, appearing between parentheses in the claims, are provided merely for convenience and are not intended to limit the claims in any way,

What is claimed is:

1. A lighting control system comprising: a camera capturing at least one image and transmitting an image signal; a processor in signal communication with the camera, wherein the processor is configured to receive the image signal and is further configured to execute an algorithm comprising; extracting, from the image signal, information describing the at least one image; processing the at least one image to determine at least two of: an indicator of natural illumination, an indicator of occupancy, and an indicator of security; and generating a control signal for a plurality of individually-controllable luminaries based on at least one indicator, wherein the plurality of individually-controllable luminaries comprises a plurality of arrangements of one or more lighting units comprising one or more LED-based light sources, wherein the processor additionally processes the at least one image to effect an adjustable per-pixel sensitivity associated with the camera, the processing comprising multiplying the at least one image with a grey-scale mask image on a per-pixel basis: wherein the camera includes a multi-channel color detector; and wherein the processor processing the at least one image to determine an average workplane illuminance in the space related to the at least one image comprises: estimating a spectral power distribution of natural daylight and electric lighting associated with the space, computing a workplane illuminance associated with the space, calculating a multiplier for the workplane illuminance based on the spectral power distribution of the natural daylight and electric lighting associated with the space, and determining the average workplane illuminance in the space by multiplying the workplane illuminance by the multiplier.

2. The lighting control system of claim 1,
wherein the at least one image comprises a first image and a second image;
wherein the processor comprises a first processor and a second processor; and
wherein the processor processing the at least one image comprises the first processor processing the first image while the second processor simultaneously processes the second image.

3. The lighting control system of claim 1,
wherein at least LED-based light source comprises an optically modulated LED for enabling optical communications.

4. A lighting control system comprising:
a camera configured to capture at least one image and to transmit an image signal including information describing the at least one image; and
a processor in signal communication with the camera, wherein the processor is configured to receive the image signal and is further configured to execute an algorithm, comprising:
extracting from the image signal the information describing the at least one image,
processing the at least one image to determine an average workplane illuminance in a space related to the at least one image,
comparing the average workplane illuminance to a range of values, and
in response to the average workplane illuminance being outside the range of values, generating at least one control signal for individually controlling at least one of a plurality of individually-controllable luminaires to adjust an illumination provided by the at least one luminaire,
wherein the camera includes a multi-color channel detector; and
wherein the processor processing the at least one image to determine an average workplane illuminance in the space related to the at least one image includes:
calculating a spectral power distribution of natural daylight and synthetic lighting associated with the space,
determining a workplane illuminance associated with the space,
calculating a multiplier for the workplane illuminance based on the spectral power distribution of the natural daylight and the synthetic lighting associated with the space, and
determining the average workplane illuminance in the space by multiplying the workplane illuminance by the multiplier.

5. The lighting control system of claim 4,
wherein the processor additionally processes the at least one image to effect an adjustable field of view associated with the camera, the processing comprising electronically masking the at least one image.

6. The lighting control system of claim 4, wherein the processor additionally processes the at least one image to effect an increase in dynamic range associated with the camera, the processing comprising subjecting the at least one image to a logarithmic transfer function before digitizing the at least one image.

7. The lighting control system of claim 4,
wherein the at least one image comprises a first image and a second image, the first image being captured before the second image; and
wherein the processor processes the at least one image by combining the first image the second image on a per-pixel basis.

8. The lighting control system of claim 4,
wherein the processor processing the at least one image comprises:
adaptively subsampling the at least one image to produce at least one lower resolution image for use by the processor, and
generating a hierarchical representation of the at least one image, the hierarchical representation comprising the at least one image in a plurality of resolutions for use by the processor.

9. The lighting control system of claim 4, wherein processing the at least one image to determine the average workplane illuminance associated with the space comprises determining an indicator of natural illumination for the space.

10. A lighting control system, comprising:
a camera configured to capture at least one image and to transmit an image signal including information describing the at least one image; and
a processor in signal communication with the camera, wherein the processor is configured to receive the image signal and is further configured to execute an algorithm, comprising:
extracting from the image signal the information describing the at least one image,
processing the at least one image to determine an average workplane illuminance in a space related to the at least one image,
comparing the average workplane illuminance to a range of values, and
in response to the average workplane illuminance being outside the range of values, generating at least one control signal for individually controlling at least one of a plurality of individually-controllable luminaires to adjust an illumination provided by the at least one luminaire,
wherein the camera comprises a red color channel, a green color channel, and a blue color channel; and
wherein the processor processing the at least one image to determine an average workplane illuminance in the space related to the at least one image comprises:
estimating a spectral power distribution of natural daylight and electric lighting associated with the space,
computing a raw workplane illuminance associated with the space,
calculating a multiplier for the raw workplane illuminance based on the spectral power distribution of the natural daylight and the electric lighting associated with the space, and
determining the average workplane illuminance in the space by multiplying the raw workplane illuminance by the multiplier.

* * * * *